United States Patent [19]

Thue

[11] 4,328,495
[45] May 4, 1982

[54] UNAMBIGUOUS DOPPLER RADAR

[75] Inventor: Baard H. Thue, Lino Lakes, Minn.

[73] Assignee: Honeywell Inc., Minneapolis, Minn.

[21] Appl. No.: 144,120

[22] Filed: Apr. 28, 1980

[51] Int. Cl.³ .............................................. G01S 13/28
[52] U.S. Cl. ........................................... 343/17.2 PC
[58] Field of Search ................................ 343/17.2 PC

[56] References Cited

U.S. PATENT DOCUMENTS

| | | | |
|---|---|---|---|
| 4,110,755 | 8/1978 | Zottl | 343/17.2 PC |
| 4,142,189 | 2/1979 | Gleason | 343/17.2 PC X |
| 4,143,373 | 3/1979 | Chernick | 343/17.1 PF |
| 4,167,737 | 9/1979 | Freedman | 343/17.2 PC |
| 4,241,347 | 12/1980 | Albanese et al. | 343/17.2 PC X |

Primary Examiner—T. H. Tubbesing
Attorney, Agent, or Firm—Albin Medved

[57] ABSTRACT

A digital pulse compression radar system with interrupted, phase coded, high duty ratio transmissions which allow contiguous range resolution cells to be established in coverage space and provide adequate airframe impulse excitation recovery time to render high duty ratio, phase coded, radar feasible for airborne applications.

Each pulse is subdivided into a predetermined number of subpulses or bits, which are phase coded with (in-phase or out-of-phase) reference to a master oscillator. In the preferred embodiment, the code is built up from a PRN code staggered over $2n-1$ pulses, each containing m resolution elements, where n is an arbitrary number designating the degree of the code and where m is an arbitrary number or is equal to the number of bits per pulse. The correlation properties of the code are such that when all bits of the returned pulses representing a word align with the delayed transmitted word, all bits add. When the bits do not align precisely, the bits generally cancel each other. Because of this, partial pulse overlaps do not produce a noticeable effect and ambiguity of the range is no longer limited by the time separation of adjacent pulses.

5 Claims, 8 Drawing Figures

UNAMBIGUOUS DOPPLER RADAR

BACKGROUND OF THE INVENTION

1. Field of the Invention

The pulsed doppler device is commonly used in the radar frequency front end of moving target indicating radar systems. Such a device obtains range resolution via pulse transmission in a conventional manner, and a doppler principle (target phase information) is used to separate moving targets from the background.

It is desirable to operate the radar with the highest possible duty ratio ("on" to "off" ratio) in order to maximally utilize the transmitter average power capability. This practice almost universally produces the lowest transmitter cost. For short range radars (a few miles of range) at UHF, the high duty ratio also commonly allows solid state construction, affording desirable improvements particularly in reliability and size. For conventional pulsed doppler radar, however, a high duty ratio either translates to ambiguous range responses which require special processing for their resolution, or such poor range resolution results that the apparatus loses usefulness.

2. Description of the Prior Art

Conventional radar systems can generally be divided into three types, as follows: pulsed doppler, continuous wave (CW), and interrupted continuous wave (ICW).

In a conventional pulsed doppler radar, a series of pulses are transmitted, each pulse having a predetermined amplitude, duration, and frequency. In order to maintain adequate average power for acceptable target size resolution, pulsed doppler radar employs a high pulse repetition frequency (PRF). High PRF, however, undesirably limits the unambiguous range of the radar which is a function of the time separation between two adjacent pulses.

A continuous wave (CW) radar overcomes the problem of range ambiguity to some extent by transmitting a continuous wave. The generated wave is transmitted through a first antenna and the reflected wave from a target is received through a second antenna. The generated wave is typically modulated with a distinct code so that the time differential between the transmitted wave and the received wave can be measured.

A short-coming of the continuous wave radar is that, as power or distance to the target increase, the transmitted signal leaks directly from the transmitting antenna to the receiving antenna in sufficient magnitude to interfere with the reception of the signal returning from the target.

The interrupted continuous wave (ICW) radar, sometimes referred to as the intermittent continuous wave, is designed to overcome the leakage problem of the continuous wave radar. In ICW, the coded bits are transmitted individually with sufficient time between the pulses to allow the receiving antenna to receive the reflected pulses. The leakage between the transmitting and the receiving antennae is thus overcome. The difficulty with ICW radar is that, for an adequate unambiguous range, the separation between individual pulses is rather long, resulting in a low average power of the transmitted signal. The "on" time of each pulse typically represents only about 3% of the duty cycle.

SUMMARY OF THE INVENTION

The invention disclosed and claimed herein is an improved pulsed doppler radar system with an increased unambiguous range. In particular, the present invention pertains to an improved pulsed doppler radar system utilizing digitally coded pulse compression signals which allow the formation of an equivalent high pulse-recurrence-frequency with a high average-power to peak-power ratio. Ambiguities are removed from the desired range without added cost of special processing.

The present invention is an improvement on a conventional high pulse repetition frequency (PRF) Doppler radar system. As mentioned previously, in such a system substantially uniform pulses of predetermined amplitude, duration, and frequency are transmitted from an antenna. Pulses reflected from a target are received by the antenna and detected to determine the distance of the target based on the transmission and reception of a specific pulse. The approaching or receding rate of target motion is determined from the Doppler shift of the pulse frequency in the reflected pulse train. The time separation between adjacent pulses determines the unambiguous range of the radar. If the time separation between adjacent pulses is less than the time required for a transmitted pulse to travel to and return from the target, ambiguity results from pulse overlap because the returned pulse may arrive during the transmission of the last pulse and be thus partially or completely eclipsed. Furthermore, since all pulses are substantially equivalent, the individual returned pulses cannot be uniquely identified and correlated with the transmitted pulses.

The present invention overcomes the shortcomings of the conventional PRF Doppler radar by adding phase modulation to each transmitted pulse. Each pulse is subdivided into a predetermined number of subpulses or bits, which are phase coded with (in-phase or out-of-phase) reference to a master oscillator. In the preferred embodiment, the code is built up from a PRN (pseudo random noise) code staggered over $2_{n-1}$ pulses, each containing m resolution elements, wherein n is an arbitrary number designating the degree of the code and where m is an arbitrary number or is equal to the number of bits per pulse. The correlation properties of the code are such that when all bits of the returned pulses representing a word align with the delayed transmitted word, all bits add. When the bits do not align precisely, the bits generally cancel each other. Because of this, partial pulse overlaps do not produce a noticeable effect and present no difficulty.

With the present invention, ambiguity of the range is no longer limited by the time separation of adjacent pulses. It is therefore possible to increase the pulse repetition frequency and thereby correspondingly increase the average-power to peak-power ratio of the radar system. The total power of the transmitted signal is thus increased substantially without increasing the peak power capability of the system. Furthermore, due to pulse coding, the resolution of the range is substantially improved. For example, in a conventional PRF Doppler system utilizing a pulse-width of 1.0 microsecond, the range resolution is 492 feet. In a system according to the present invention, wherein each pulse is subdivided into several bits, the range resolution is a function of bit-width. If, for example, the pulse is divided into five bits 200 nanosecond bit-width, the range resolution would be 98.4 feet, an improvement by a factor of five over conventional PRF Doppler with identical pulse-width.

An object of the present invention is to provide a digital pulse compression with intermittent transmission and freely chosen range resolution.

A further object of the present invention is to provide a digital pulse compression radar system with interrupted, phase coded transmission which allow contiguous range resolution cells in the coverage space.

A more specific object of the present invention is to provide a digital pulse compression radar system with interrupted, phase coded, high duty ratio transmissions which allow contiguous range resolution cells to be established in coverage space and provide adequate airframe impulse excitation recovery time to render high duty ratio, phase coded, radar feasible for airborne applications.

These and further objects will become apparent to those skilled in the art upon examination of the following specification, claims and associated drawings.

DESCRIPTION OF THE PREFERRED EMBODIMENT

Figure 1:
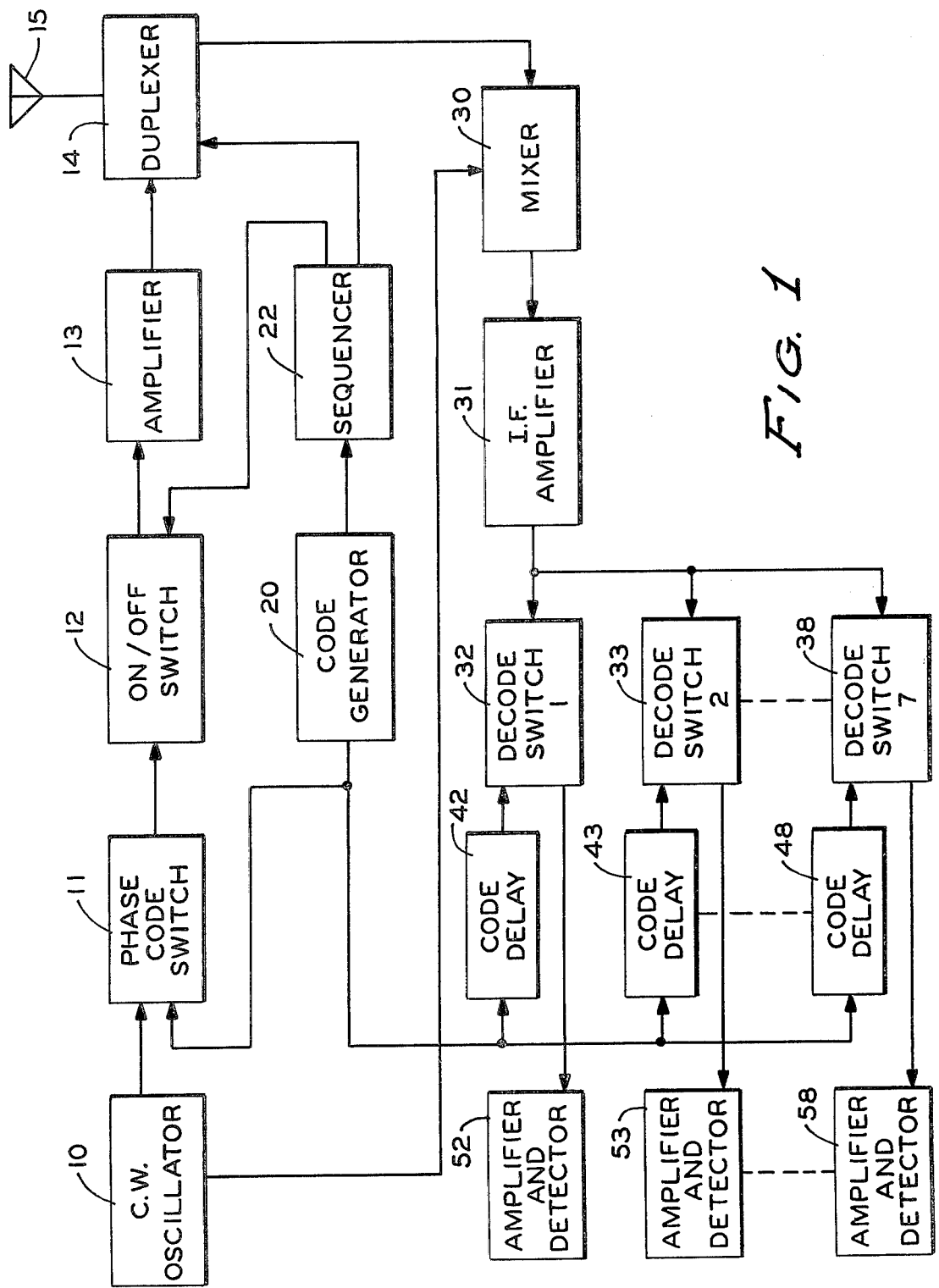
FIG. 1 is a schematic block diagram of the preferred embodiment of a digital pulse compression radar system in accordance with the present invention.

In the embodiment of the present invention illustrated in FIG. 1, a continuous wave oscillator 10 is shown having a first output connected to a first input of a phase code switch 11 and a second output connected to a first input of a mixer 30. Phase code switch 11 has an output which is connected to the input of an on/off switch 12, which in turn has its output connected through an amplifier 13 to a first input of a duplexer 14, and thereby to an antenna 15. Further shown in FIG. 1 is a code generator 20 having a first output connected to the second input of said phase code switch 11 and also to the inputs of code delays 42–48. Code generator 20 further has an output connected to the input of a sequencer 22, which in turn has a first output connected to the control input of on/off switch 12 and a second output connected to a second input of duplexer 14. Duplexer 14 has an output connected to mixer 30, wherein the signal received by antenna 15 and the signal from oscillator 10 are combined. The resulting signal from mixer 30 is applied to the input of an IF amplifier 31 and from the output of amplifier 31 to the first inputs of a plurality of decode switches 32 through 38. Decode switches 32 through 38 further each have a second input where they receive the signal from the output of code delays 42–48. The outputs of decode switches 32–38 are applied to the inputs of amplifiers and detectors 52–58 respectively.

Figure 2:
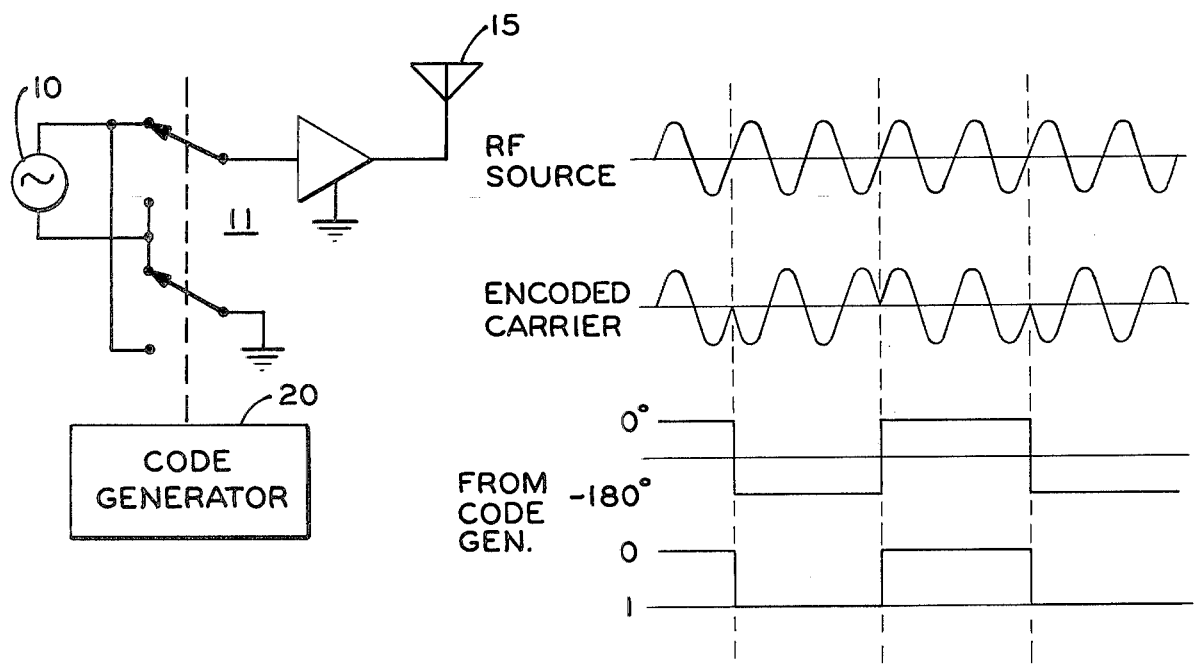
FIG. 2 is a conceptual illustration of a fast phase commutator for generation of a bi-phase coded carrier.

An embodiment of phase code switch 11 is illustrated conceptually in FIG. 2 of the drawing. The coding of the transmitted signal is simply accomplished with a fast phase commutator (bi-phase switch) which is operated in response to the code provided by code generator 20. The resulting signal is a string of alternating relative phase (0°, 180°) radio frequency pulses.

Figure 3:
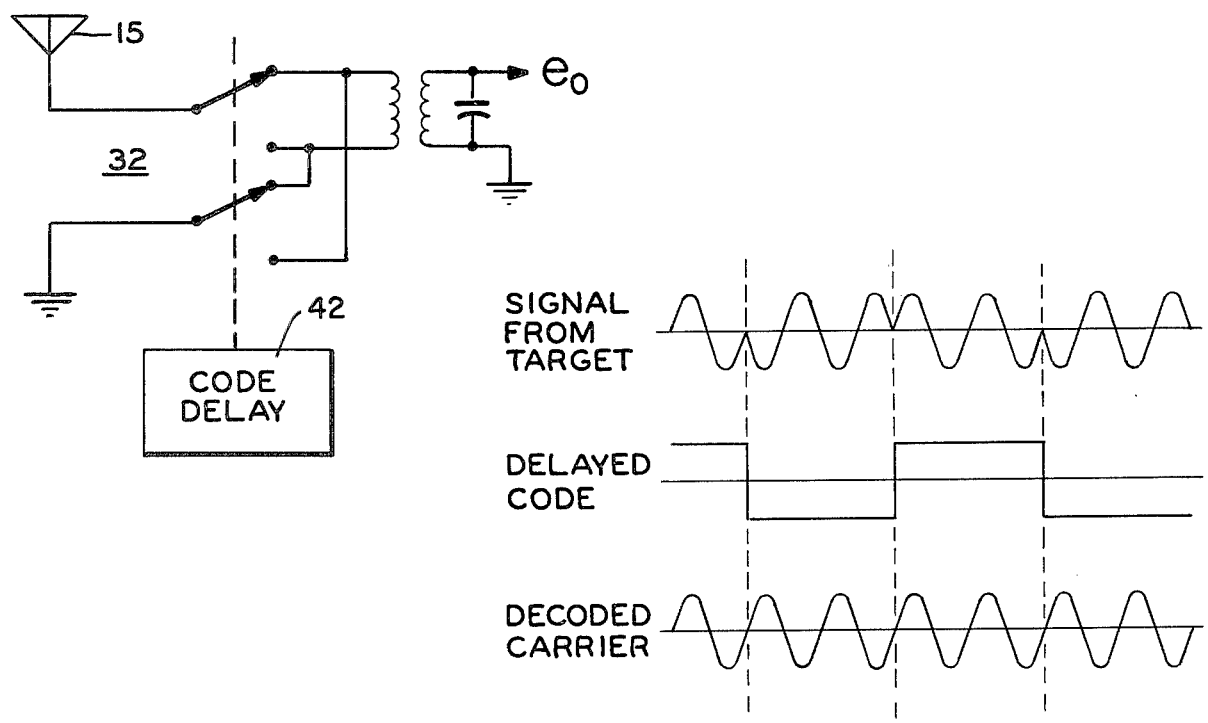
FIG. 3 is a conceptual illustration of a fast phase demodulator for decoding the bi-phase coded carrier.

Decoding reception of return signals from the target is essentially a reversal of the decoding process accomplished by phase code switch 11. FIG. 3 illustrates conceptually the principle of operation of decode switch 32 through 38. The signals provided to decode switch 32–38 by code delays 42–48 are identical to the code generated by code generator 20, but delayed by predetermined amounts corresponding to the radar range. Each delay is a function of the time it takes the transmitter signal to travel to and return from a specified point in space. The signals appearing at the output of each decode switch 32–38 are a function of the correlation between the returned signal received from the target and the delayed signal from code delays 42–48, respectively.

Oscillator 10 generates RF power at the desired frequency. Phase code and on/off switches 11 and 12 modulate the RF signal responsive to the output from code generator 20 and sequencer 22. Amplifier 13 raises the RF power to the desired level and duplexer 14 delivers the amplified signal to antenna 15 for transmission into space.

When a signal returned from a target is received by antenna 15, duplexer 14 connects antenna 15 to the input of mixer 30, in a conventional manner well known in the art. In mixer 30, the signal from antenna 15 is translated in frequency to some convenient intermediate value. Following amplification by IF amplifier 31, the signal is decoded by decode switches 32 through 38, which are controlled from code generator 20 via the code time delays 42–48. Subsequent amplification and other signal conditioning is done in amplifiers and detectors 52 through 58 in the manner well known in the art.

Figure 4:
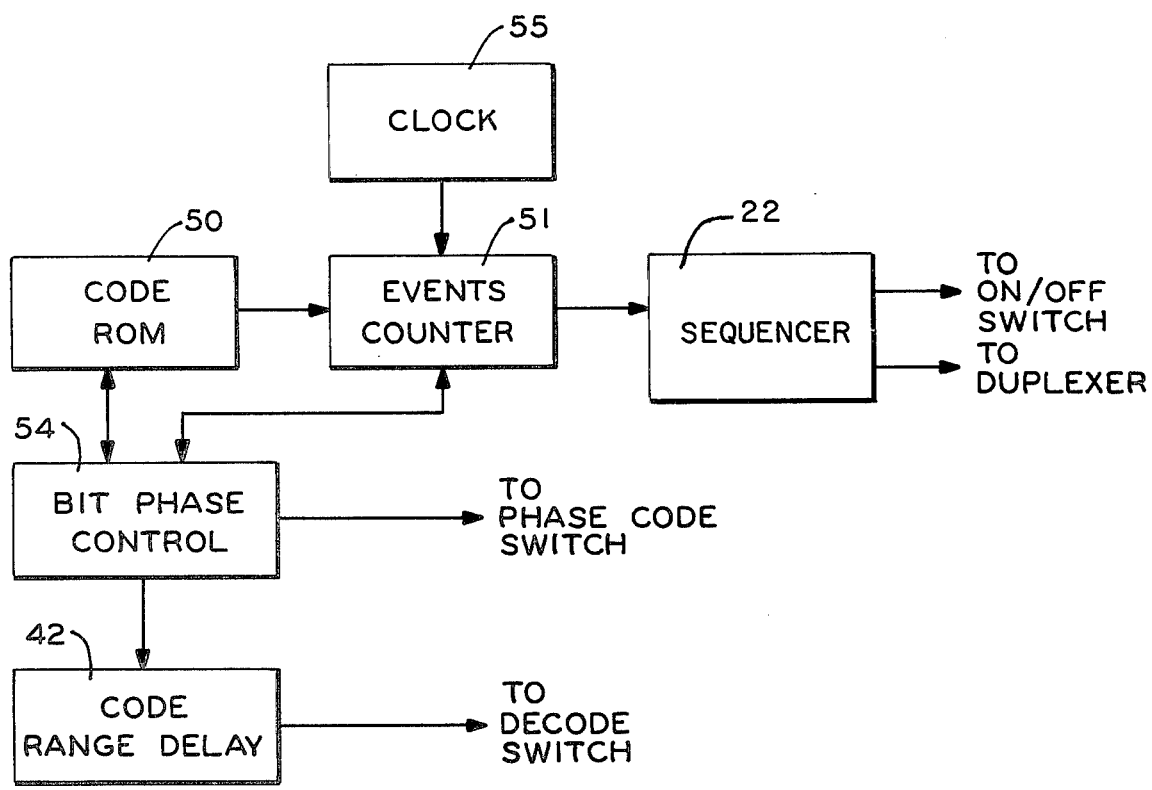
FIG. 4 is a more detailed illustration of the code generator and sequencer of FIG. 1.

The operation of code generator 20 and sequencer 22 will be understood more easily with reference to FIG. 4. Code generator 20 includes a code ROM 50 (read only memory), an events counter 51, a bit phase control 54 and a clock 55. ROM 50 contains stored therein a predetermined code sequence.

Figure 5:
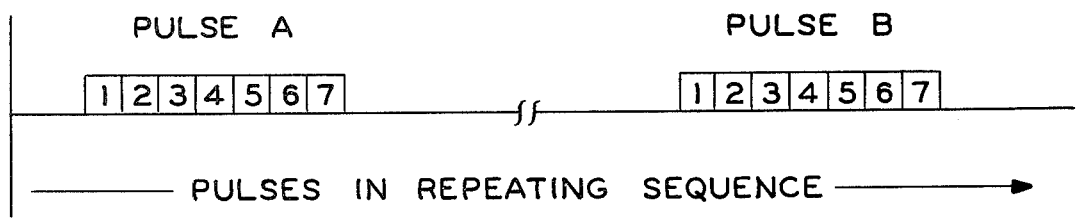
FIG. 5 illustrates the format of the coded pulses transmitted through the antenna of the apparatus shown in FIG. 1.

Events counter 51 receives at its first input timing pulses from a clock 55 and generates switch commands in accordance with the format shown in FIG. 5. Bit phase control 54 also receives the code from code ROM 50 and provides a series of pulses to phase code switch 11 of FIG. 1. The code generated is delayed in the code range delay 42 by a precise amount of time corresponding to the radar range delay. Switching commands are generated in code range delay 42 and sent to the input of decode switch 32 of FIG. 1.

Table 1 below shows a code sequence used in a preferred embodiment of the invention. It consists of 31 pulses each comprised of 7 bits. It is a compound code constructed from a 31 bit (N=5) PRN code, and a 7 bit Barker code. PRN codes and Barker codes are well known to those skilled in the art. Description of these codes can be found in *Radar Design Principles* by F. E. Nathanson, McGraw-Hill, 1969, Sec. 12.4 and Sec. 12.5, respectively.

TABLE 1

| Pulse Number | \multicolumn{7}{c}{Bit Number in Pulse} |
|---|---|---|---|---|---|---|---|
| | bit 1 | bit 2 | bit 3 | bit 4 | bit 5 | bit 6 | bit 7 |
| 1 | 0 | 0 | 0 | 0 | 1 | 1 | 0 |
| 2 | 0 | 0 | 1 | 1 | 0 | 1 | 1 |
| 3 | 0 | 1 | 0 | 0 | 0 | 0 | 0 |
| 4 | 1 | 0 | 1 | 0 | 1 | 1 | 1 |
| 5 | 0 | 1 | 1 | 1 | 0 | 0 | 0 |
| 6 | 1 | 1 | 0 | 0 | 1 | 1 | 1 |
| 7 | 1 | 0 | 1 | 1 | 0 | 0 | 1 |
| 8 | 0 | 1 | 0 | 0 | 1 | 0 | 1 |
| 9 | 1 | 0 | 1 | 1 | 1 | 0 | 0 |
| 10 | 0 | 1 | 0 | 1 | 1 | 1 | 0 |
| 11 | 1 | 0 | 0 | 1 | 0 | 1 | 0 |
| 12 | 0 | 0 | 0 | 0 | 0 | 1 | 1 |
| 13 | 0 | 0 | 1 | 0 | 0 | 0 | 0 |
| 14 | 0 | 1 | 1 | 0 | 1 | 1 | 0 |
| 15 | 1 | 1 | 1 | 1 | 0 | 1 | 0 |
| 16 | 1 | 1 | 0 | 0 | 0 | 1 | 0 |
| 17 | 1 | 0 | 1 | 0 | 0 | 1 | 0 |
| 18 | 0 | 1 | 1 | 0 | 0 | 1 | 1 |
| 19 | 1 | 1 | 1 | 0 | 0 | 0 | 1 |
| 20 | 1 | 1 | 1 | 0 | 1 | 0 | 0 |
| 21 | 1 | 1 | 1 | 1 | 1 | 1 | 1 |
| 22 | 1 | 1 | 0 | 1 | 0 | 0 | 1 |
| 23 | 1 | 0 | 0 | 0 | 1 | 0 | 0 |
| 24 | 0 | 0 | 1 | 1 | 1 | 1 | 0 |
| 25 | 0 | 1 | 0 | 1 | 0 | 1 | 1 |
| 26 | 1 | 0 | 0 | 0 | 0 | 0 | 1 |
| 27 | 0 | 0 | 1 | 0 | 1 | 0 | 1 |
| 28 | 0 | 1 | 1 | 1 | 1 | 0 | 1 |
| 29 | 1 | 1 | 0 | 1 | 1 | 0 | 0 |
| 30 | 1 | 0 | 0 | 1 | 1 | 1 | 1 |
| 31 | 0 | 0 | 0 | 1 | 0 | 0 | 0 |

Each transmitted pulse comprises seven subpulses or bits which are phase coded either in phase or out-of-phase referred to CW oscillator 10. Thirty-one pulses constitute a code word which repeats for the duration the transmitter is keyed on. Thus a code word thirty-one pulses long contains 217 bits.

The 31 bit PRN sequence, generated from a $75_8$ polynomial, is shown below in Table 2.

TABLE 2

| Bit No. | Bit Value | Bit No | Bit Value |
|---|---|---|---|
| 1 | 0 | 17 | 1 |
| 2 | 0 | 18 | 0 |
| 3 | 0 | 19 | 1 |
| 4 | 1 | 20 | 1 |
| 5 | 0 | 21 | 1 |
| 6 | 1 | 22 | 1 |
| 7 | 1 | 23 | 1 |
| 8 | 0 | 24 | 0 |
| 9 | 1 | 25 | 0 |
| 10 | 0 | 26 | 1 |
| 11 | 1 | 27 | 0 |
| 12 | 0 | 28 | 0 |
| 13 | 0 | 29 | 1 |
| 14 | 0 | 30 | 1 |
| 15 | 1 | 31 | 0 |
| 16 | 1 | | |

The PRN code is multiply distributed over the 31 pulses constituting each word as shown in the matrix of Table 3.

TABLE 3

| Pulse Number | \multicolumn{7}{c}{Bit NUmber in Pulse} |
|---|---|---|---|---|---|---|---|
| | Bit 1 | Bit 2 | Bit 3 | Bit 4 | Bit 5 | Bit 6 | Bit 7 |
| 1 | 1 | 2 | 3 | 4 | 5 | 6 | 7 |
| 2 | 2 | 3 | 4 | 5 | 6 | 7 | 8 |
| 3 | 3 | 4 | 5 | 6 | 7 | 8 | 9 |
| 4 | 4 | 5 | 6 | 7 | 8 | 9 | 10 |
| 5 | 5 | 6 | 7 | 8 | 9 | 10 | 11 |
| 6 | 6 | 7 | 8 | 9 | 10 | 11 | 12 |
| 7 | 7 | 8 | 9 | 10 | 11 | 12 | 13 |
| 8 | 8 | 9 | 10 | 11 | 12 | 13 | 14 |
| 9 | 9 | 10 | 11 | 12 | 13 | 14 | 15 |
| 10 | 10 | 11 | 12 | 13 | 14 | 15 | 16 |
| 11 | 11 | 12 | 13 | 14 | 15 | 16 | 17 |
| 12 | 12 | 13 | 14 | 15 | 16 | 17 | 18 |
| 13 | 13 | 14 | 15 | 16 | 17 | 18 | 19 |
| 14 | 14 | 15 | 16 | 17 | 18 | 19 | 20 |
| 15 | 15 | 16 | 17 | 18 | 19 | 20 | 21 |
| 16 | 16 | 17 | 18 | 19 | 20 | 21 | 22 |
| 17 | 17 | 18 | 19 | 20 | 21 | 22 | 23 |
| 18 | 18 | 19 | 20 | 21 | 22 | 23 | 24 |
| 19 | 19 | 20 | 21 | 22 | 23 | 24 | 25 |
| 20 | 20 | 21 | 22 | 23 | 24 | 25 | 26 |
| 21 | 21 | 22 | 23 | 24 | 25 | 26 | 27 |
| 22 | 22 | 23 | 24 | 25 | 26 | 27 | 28 |
| 23 | 23 | 24 | 25 | 26 | 27 | 28 | 29 |
| 24 | 24 | 25 | 26 | 27 | 28 | 29 | 30 |
| 25 | 25 | 26 | 27 | 28 | 29 | 30 | 31 |
| 26 | 26 | 27 | 28 | 29 | 30 | 31 | 1 |
| 27 | 27 | 28 | 29 | 30 | 31 | 1 | 2 |
| 28 | 28 | 29 | 30 | 31 | 1 | 2 | 3 |
| 29 | 29 | 30 | 31 | 1 | 2 | 3 | 4 |
| 30 | 30 | 31 | 1 | 2 | 3 | 4 | 5 |
| 31 | 31 | 1 | 2 | 3 | 4 | 5 | 6 |

Figure 6:
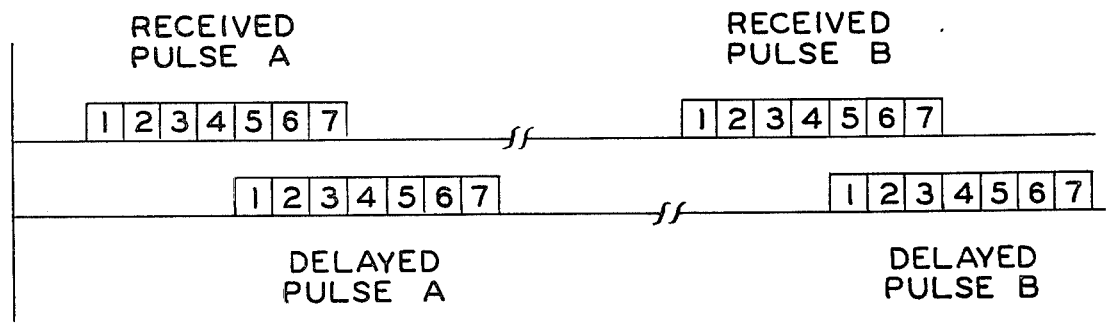
FIG. 6 illustrates coded pulses received by the antenna in FIG. 1 and compared to delayed pulses from the code generator.

Each of the seven columns in Table 3 consists of the same basic code except for a shift in the bit number. For example, the second bit of pulse number 1 is the second bit in the PRN sequence of Table 1. The purpose of "vertical" sequencing of the code is simply to accommodate the pulsed format where partial correlation is required. This is best illustrated with reference to FIG. 6 of the drawing. If, for a given range delay, the received pulses reflected from a target occur 4 bits earlier than the range delayed reference, a partial overlap of the received pulses and the delayed reference occurs. In the example of FIG. 6, only bits 5, 6, and 7 of the received pulse will be operated on by the reference code. There is an identical bit chain associated with each reference bit 1 through 7 and, hence, in correlating bits 1, 2, and 3 of the reference (delayed) signal with bits 5, 6, and 7 of the returning (received) signal, the full 31 bit code is correlated. Thus, the "vertical" ordering in Table 3 allows full code correlation for partial pulse overlap. Such ordering of the code bits leaves a residue of one per overlapping pulse bit, all of the same phase. The intra-pulse resolution is improved by the application of a 7 bit Barker code as an overlay on each pulse. Each transmitted pulse is the product of the PRN code shown in Table 3 and a 7-bit Barker code shown in Table 4, below

TABLE 4

| Bit No. | 1 | 2 | 3 | 4 | 5 | 6 | 7 |
|---|---|---|---|---|---|---|---|
| Bit value | 1 | 1 | 1 | 0 | 0 | 1 | 0 |

The transmitted code shown in Table 1 is, thus, a product of the appropriate PRN bit with the Barker bit corresponding to the location in the pulse.

Figure 7:
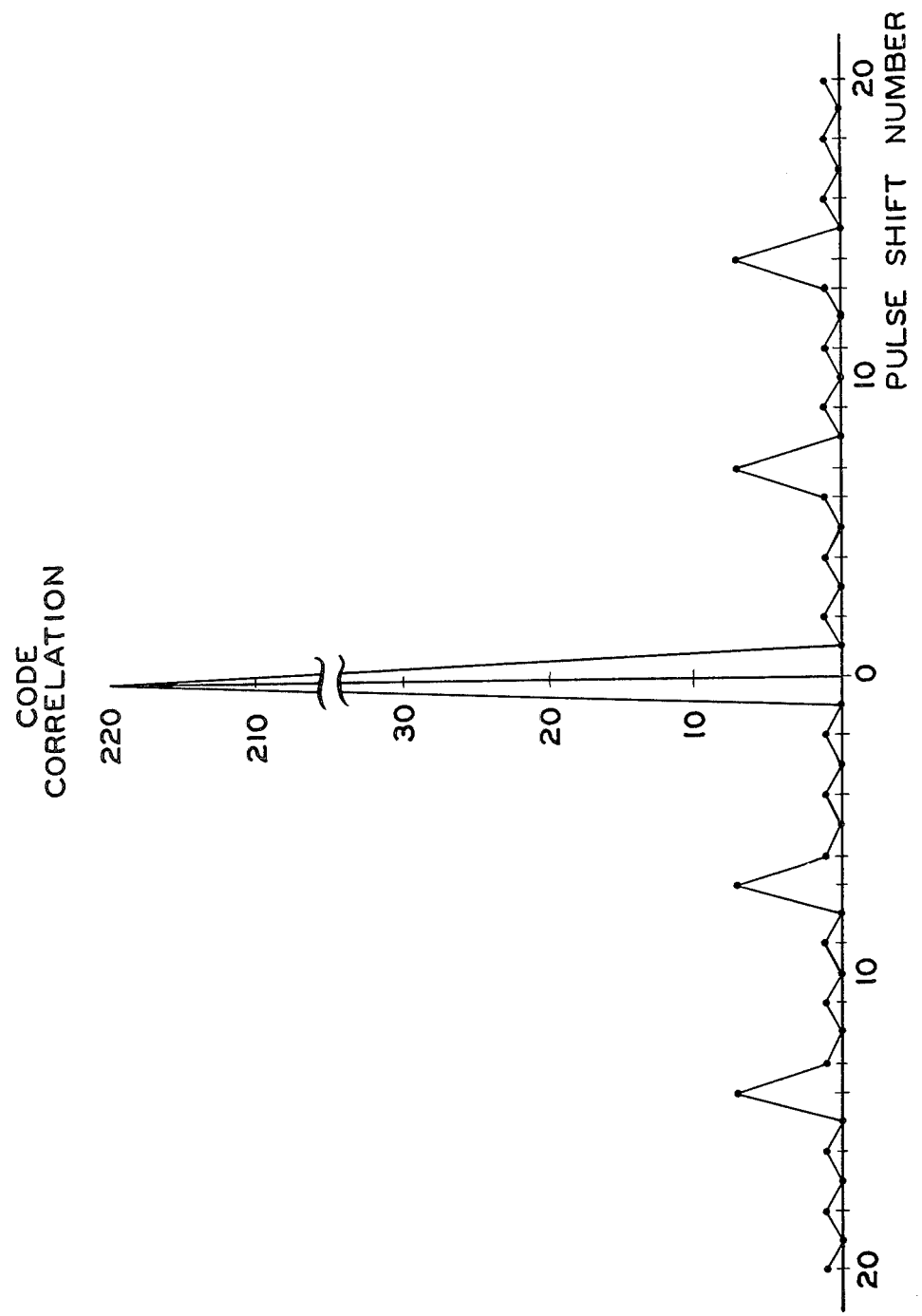
FIG. 7 is a graphical representation of the correlating properties of the code employed in the preferred embodiment of the present invention.

FIG. 7 in the drawings shows the correlation of the code described above as a function of integer bit range delays. With perfect match between the received and delayed pulses, the correlation is very high, as shown by the peak of 220 at zero bit displacement. When the bits of corresponding received and delayed pulses do not align precisely, the bits cancel each other to a great degree. Any separation between the received and delayed pulses, therefore, results in a drastic reduction of correlation. A great advantage of the above code, as can be seen from the graph of FIG. 7, is that partial overlaps of pulses produce no noticeable effect.

As mentioned previously, in an apparatus according to the present invention ambiguity of the range is no longer limited by the time separation of adjacent pulses. It is possible, therefore, to increase the pulse repetition frequency and thereby correspondingly increase the average-power to peak-power ratio of the radar system without increasing the peak power of the system.

The range of the radar, or the distance in space viewed at any particular moment, depends on the range delay as determined by code delays 42 through 48 in FIG. 1. By providing a plurality of decode switches (32 to 38) and associated code delays (42 to 48) with delays one bit-width apart, the radar is able to "see" with a depth of view which is a function of the product of the bit-width and number of code delays. The range resolution is an inverse function of the bit-width.

Figure 8:
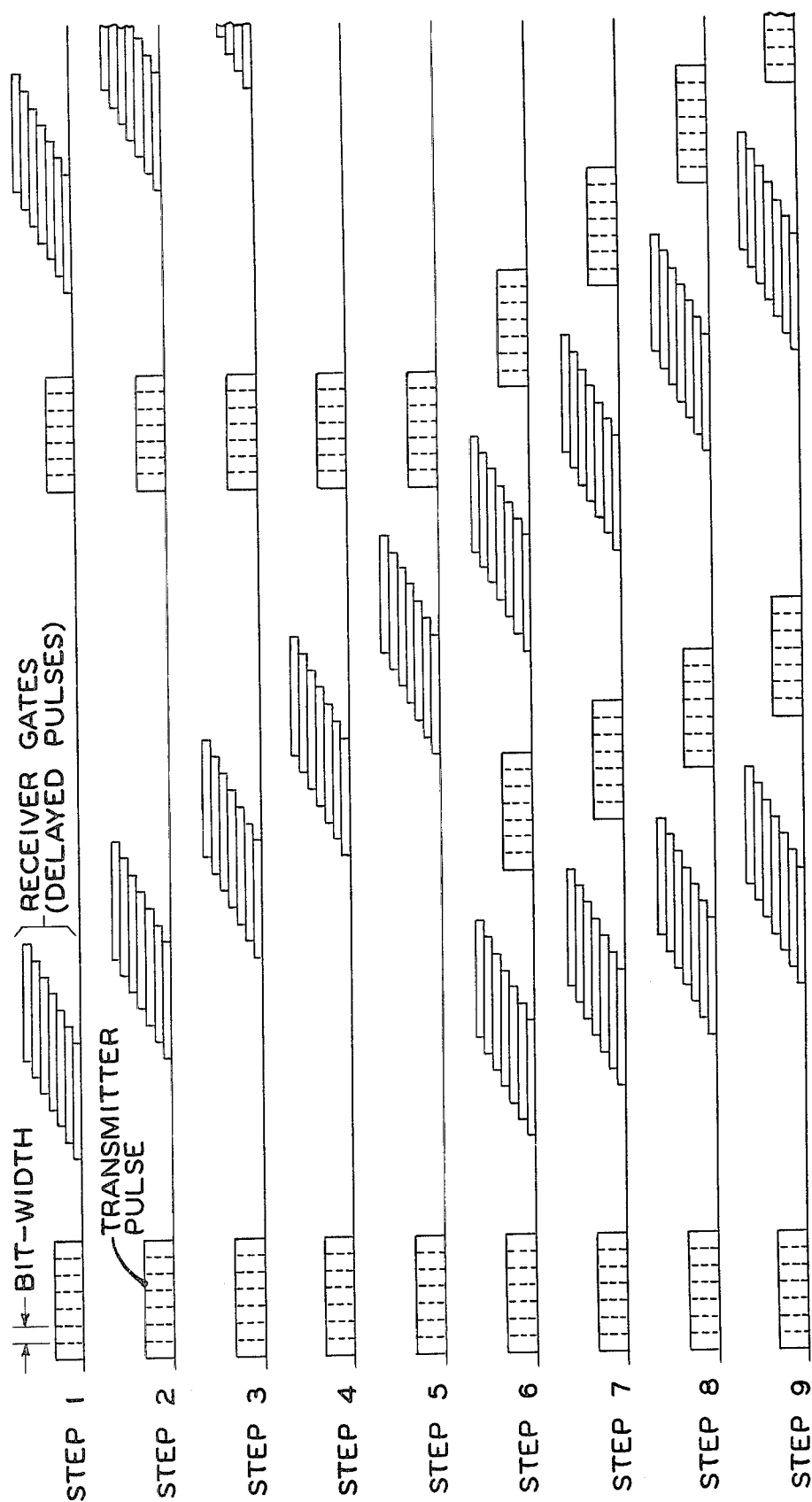
FIG. 8 illustrates graphically the stepping of code delays through different range delays to vary the range of the radar.

In order for the radar system shown in FIG. 1 to have volumetric coverage in space without "holes", the code delays are periodically stepped through different range delays as shown in FIG. 8. The time separation between the transmitted pulse and the delayed pulses is varied from step to step, thereby varying the range of the radar in a manner well known to those skilled in the art. The volume in space surveyed by the radar may be likened to a partial spherical shell (depending on antenna transmission pattern) which periodically expands and contracts to sweep the required volume of space to be surveyed by the radar. Each of the lines of the graph in FIG. 8 represent one step of the range delays. The seven delayed pulses generated by code delays 42 to 48 of FIG. 1 are contiguous and move together as a block when the range is stepped. The steps overlap by one gate width.

A unique and improved pulsed doppler radar system comprising digitally coded pulse compression signals has been shown and described in the foregoing specification. Various modifications of the inventive concepts will be obvious to those skilled in the art, without departing from the spirit of the invention. It is intended that the scope of the invention be limited only by the following claims.

I claim:

1. An improved pulsed doppler radar system comprising:

means for generating substantially uniform pulses of predetermined amplitude, duration, and frequency;

encoding means for encoding said pulse with a code built up from a PRN code staggered over $2_{n-1}$ pulses, each containing m resolution elements, where n is an arbitrary number designating the degree of the code and where m is an arbitrary number or is equal to the number of bits per pulse;

transmitting means for receiving encoded pulses from said encoding means and transmitting said encoded pulses into space;

delay means for receiving encoded pulses from said encoding means and delaying said encoded pulses by a predetermined delay time;

means for receiving pulses reflected from a target located in space; and means for decoding said received pulses reflected from a target with delayed pulses from said delay means and thereby determine the range and the approaching or receding rate of the target.

2. Apparatus according to claim 1, wherein said means for generating pulses includes a constant frequency oscillator and each of said pulses consists of a predetermined integral number of cycles of the signal produced by said constant frequency oscillator; and wherein said encoding means includes a phase commutator operated in response to said code.

3. Apparatus according to claim 2, wherein said means for generating pulses comprising means for generating a predetermined number of subpulses each comprising a portion of the signal produced by said constant frequency oscillator, each said subpulse being able to assume one of two distinctive states, one of said states being in phase with said constant frequency oscillator and the other of said states being 180° out of phase with said constant frequency oscillator.

4. Apparatus according to claims 1, 2, or 3, wherein said encoding means comprises means for generating a code which is a product of said PRN code and a Barker code.

5. Apparatus according to claims 1, 2, or 3, wherein said delay means comprises means to delay each of said encoded pulses by a plurality of predetermined time delays and provide a plurality of identical pulses each delayed by a different predetermined time; and said means for decoding reflected pulses received from a target comprises means for decoding said reflected pulses with each of said plurality of identical delayed pulses.

* * * * *